United States Patent
Hubis et al.

(10) Patent No.: US 6,182,198 B1
(45) Date of Patent: Jan. 30, 2001

(54) METHOD AND APPARATUS FOR PROVIDING A DISC DRIVE SNAPSHOT BACKUP WHILE ALLOWING NORMAL DRIVE READ, WRITE, AND BUFFERING OPERATIONS

(75) Inventors: Walter A. Hubis, Louisville; Noel S. Otterness, Boulder, both of CO (US)

(73) Assignee: International Business Machines Corporation, Armonk, NY (US)

(*) Notice: Under 35 U.S.C. 154(b), the term of this patent shall be extended for 0 days.

(21) Appl. No.: 09/326,498

(22) Filed: Jun. 4, 1999

Related U.S. Application Data

(60) Provisional application No. 60/088,206, filed on Jun. 5, 1998.

(51) Int. Cl.[7] .............................. G06F 12/16; G06F 11/20
(52) U.S. Cl. ........................ 711/162; 711/114; 711/113; 711/112; 714/6; 707/204
(58) Field of Search ................................... 711/162, 114, 711/113, 112; 714/6; 707/204

(56) References Cited

U.S. PATENT DOCUMENTS

| | | | |
|---|---|---|---|
| 5,123,099 | * 6/1992 | Shibata et al. | 711/120 |
| 5,163,148 | * 11/1992 | Walls | 707/204 |
| 5,263,154 | * 11/1993 | Eastridge et al. | 714/6 |
| 5,544,347 | * 8/1996 | Yanai et al. | 711/162 |
| 5,555,371 | * 9/1996 | Duyanovich et al. | 714/13 |
| 5,692,155 | * 11/1997 | Iskiyan et al. | 711/162 |
| 5,754,756 | * 5/1998 | Watanabe et al. | 714/6 |
| 5,761,705 | * 6/1998 | DeKoning et al. | 711/113 |
| 5,835,953 | * 11/1998 | Ohran | 711/162 |
| 5,852,715 | * 12/1998 | Raz et al. | 709/201 |

FOREIGN PATENT DOCUMENTS 0 566 966 A2 10/1993 (EP) .
WO98/53400 A1 * 11/1998 (WO) .

OTHER PUBLICATIONS

User's Guide Novell Perfect Office for Windows, Word Perfect, The Best–Selling Word Processor for all Time v 6.1, pp 152–154, 159, & 753–754, 1994.*

* cited by examiner

Primary Examiner—Eddie P. Chan
Assistant Examiner—Hong Kim
(74) Attorney, Agent, or Firm—Flehr Hohbach Test Albritton & Herbert LLP

(57) ABSTRACT

The present invention is a method and system of performing a snapshot backup of a storage unit of a host system. The host system includes at least one primary system drive, a primary logic unit, a log system drive and at least one backup logic unit. A particular method is designed to perform the snapshot backup while allowing normal read operations and write operations to occur. After initializing the snapshot backup, the method processes a write operation of new data submitted to the primary logic unit to be written to the primary system drive during the snapshot backup by reading the old data that is on the primary system drive, buffering the old data, overwriting the old data and writing the old data to the log system drive if the write operation is the first write operation to a specific sector in the primary system drive for the snapshot backup. The method executes a read operation during the snapshot backup by processing the read operation submitted to the backup logic unit by accessing the requested data from the log system drive if the requested data is available from the log system drive, if not, accessing the requested data from the primary system drive.

27 Claims, 7 Drawing Sheets

NV Memory 133

| Firmware | 134 |
|---|---|
| Commands | 142 |
| Initiate Snapshot | 144 |
| Error Conditions | 144A |
| Terminate Snapshot | 145 |
| Error Conditions | 145A |
| Start Long Operation | 146 |
| Return Data | 146A |
| Get Long Operation Status | 147 |
| Return Data | 147A |
| Configuration Structure | 135 |
| RAID Field | 148 |
| LOG | 149 |

FIG. 4

METHOD AND APPARATUS FOR PROVIDING A DISC DRIVE SNAPSHOT BACKUP WHILE ALLOWING NORMAL DRIVE READ, WRITE, AND BUFFERING OPERATIONS

This application claims the benefit of U.S. Provisional No. 60/088,206 filed Jun. 5, 1998.

The present invention relates generally to various method for implementing improved backup procedures for disk arrays, and particularly for implementation on the DAC9060SX and DAC9060SF disk array controllers.

TECHNICAL FIELD

Background of the Invention

The problem of data backup continues to grow with the storage capacity of disk drive arrays. Disk drives continue to grow in speed and capacity, while cost per unit storage continues to decline. This explosion of capacity has placed severe demands on data backup techniques. RAID mechanisms have the potential to minimize the frequency of backups.

As servers become increasingly fault tolerant, RAID storage systems are expected to remain available at all times. Backup procedures can be performed directly by the host system, but this results in lowered system performance. In addition, there are issues with on-line data base systems where a consistent copy of the database is required not only for backup, but for data mining operations. In these cases, the backup copy of the array can be made while normal read and write operations continue to the storage system. This is referred to as a snapshot.

In the prior art, a snapshot backup is accomplished using RAID 1 or mirrored disk drives in a storage system, as shown in FIG. 1. The database is first synchronized to the storage system 21 to flush any data or meta-data out of the server's internal cache (not shown). The mirrored RAID set 22b is then removed, and placed into a second system 23 for backup or analysis. When complete, the mirrored set 22b is returned to the original storage system 21 where mirror set 22b is synchronized to a master set 24. These systems usually use two mirrored drives 22a, 22b to allow redundancy while one of the mirror sets 22b is used for backup.

There are several problems with this process:

The backup is a manual process. Human intervention is required to move the disks from one system to the next. This requires scheduling for the backup or checkpoint operation, as well as the cost of the operator. Physically moving the drives can also result in accidental damage to the drives through rough handling, and wear and tear on the connectors.

For a fully redundant system as shown in FIG. 1, a 200% storage overhead is required. These costs can include the disk drives, cooling fans, power supplies, UPS systems, cabinets, and floor space.

Performance degradation occurs on RAID subsystem 26 as replaced drives 22a, 22b are rebuilt and made coherent with the master set 24.

A restriction that applies to RAID subsystem 26 is that no knowledge of the file system can be assumed, and there is no a priori knowledge of read or write patterns. For any backup strategy other than host backup, there is no way to guarantee that the information on the drive is synchronized with the host system. A method for synchronizing the host cache to the storage system is always be required.

Therefore it would be desirable to provide a new and improved method and apparatus for generating a snapshot backup that is capable of dealing with arbitrarily large disk arrays, and utilizes a smaller storage overhead.

It would also be desirable to provide a new and improved method and apparatus for generating a snapshot backup that can allow read and write operations to occur while a snapshot backup is in progress.

It would also be desirable to provide a new and improved method and apparatus for generating a snapshot backup that can implement the use of dual-active controllers.

SUMMARY OF THE INVENTION

The present invention is a method and system of performing a snapshot backup of a storage unit of a host system. The host system includes at least one primary system drive, a primary logic unit, a log system drive and at least one backup logic unit. A particular method is designed to perform the snapshot backup while allowing normal read operations and write operations to occur. After initializing the snapshot backup, the method processes a write operation of new data submitted to the primary logic unit to be written to a sector of the primary system drive during the snapshot backup by reading the old data that is on the primary system drive which is to be overwritten by the new data in response to the write operation, buffering the old data, overwriting the old data with the new data and writing the old data to the log system drive if the write operation is the first write operation to that specific sector in the primary system drive for the snapshot backup. The method executes a read operation during the snapshot backup by processing the read operation submitted to the backup logic unit by accessing the requested data of the read operation from the log system drive if the requested data is available from the log system drive and returning the requested data to a requester, if not, accessing the requested data from the primary system drive and returning the requested data to the requester.

A particular system embodiment implemented in a host system performs a snapshot backup of the drive system of the host system. The system includes at least one controller which initializes and terminates the snapshot backup. The system further includes at least one backup logic unit which is electronically coupled to a log system drive such that the requested data is accessed from the log system drive if the requested data is available from the log system drive during a read operation and is returned to the requester. If the data is not available from the log system drive then the backup logic unit, which is also electronically coupled to at least one primary system drive, accesses the requested data from the primary system drive during the read operation and returns the data to the requester. The system further includes at least one primary logic unit which is electronically coupled to the primary system drive such that new data submitted to the primary logic unit during a write operation is written to a sector of the primary system drive. A buffer is electronically coupled to the primary system drive such that the old data that is to be overwritten by the new data submitted to the primary logic unit is buffered prior to being overwritten. The buffer is further electronically coupled to the log system drive such that the old data is written to the log system drive if the new data written to the primary system drive is the first data to be written to the sector during the snapshot backup.

BRIEF DESCRIPTION OF THE DRAWINGS

Additional objects and features of the invention will be more readily apparent from the following detailed description and appended claims when taken in conjunction with the drawings, in which:

FIG. 4 is a block diagram of a controller memory including the command and configuration structure of the snapshot backup;

DESCRIPTION OF THE PREFERRED EMBODIMENT

The snapshot backup method and system were initially disclosed in the provisional application, Ser. No. 60/088,206, which is incorporated herein by reference.

The backup method of the present invention is capable of dealing with arbitrarily large disk arrays. It also allows normal read and write operations to occur while a snapshot backup process proceeds. It is fully automatic, and there is a much smaller storage overhead. In addition, this backup method is ideally suited to the dual-active nature of the DAC960SX and DAC960SF controllers.

The general features for the snapshot backup are:

1. The mechanism allows a snapshot backup of an array at an arbitrary point in time. Normal read and write operations to the array can continue. This feature implies two logical access paths to the array.

2. The mechanism has minimal storage overhead.

3. The method does not inherently degrade performance. There is minimal performance loss to normal I/O operations while the backup process proceeds. Given unlimited processor and system resources, the method would not reduce performance. In a real system, this is not possible, since the backup procedure uses system resources such as processor instruction cycles and memory, but that should be the only loss of performance.

4. The method works at the block level. There are no file system dependencies or a priori knowledge of read and write patterns.

5. The method is fully automatic. No operator intervention is required.

6. The method is robust. Data written and read can be redundancy protected at all times. This implies that the normal single point of failure requirements can apply.

Figure 1:
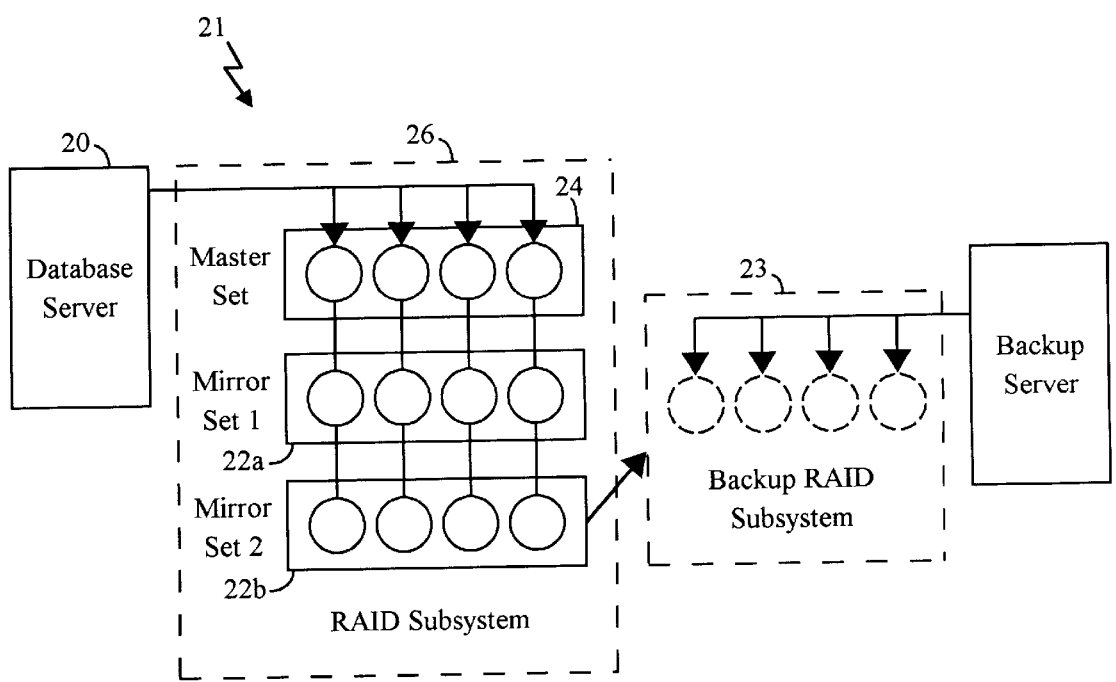
FIG. 1 is a block diagram of a prior art snapshot process that employs mirrored disk drives that are physically removed form a RAID subsystem.
Figure 2:
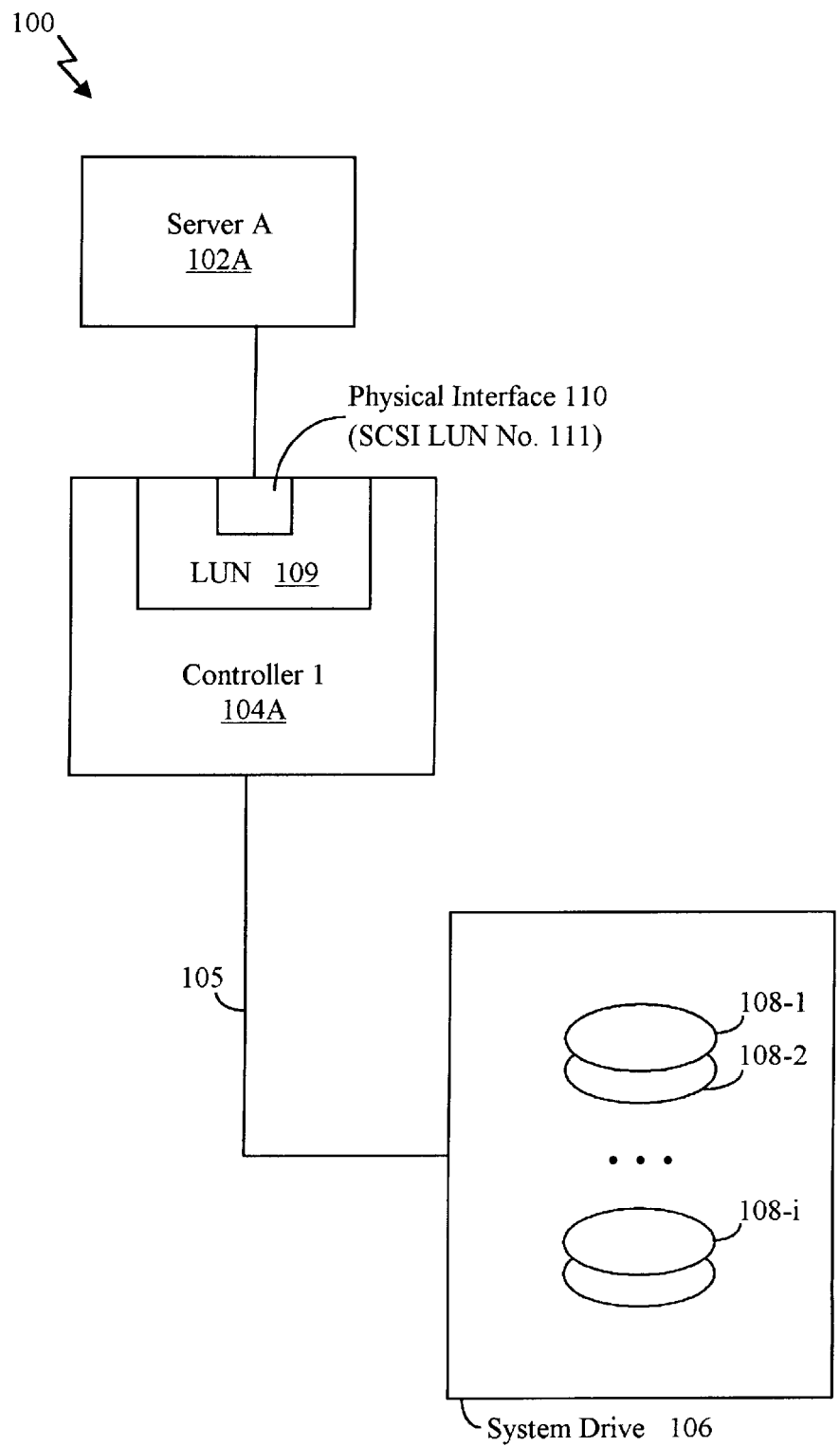
FIG. 2 is a block diagram of a single controller system that controls the snapshot backup of the drive system.

FIG. 2 shows a block diagram of a controller system 100 in which the present invention can be implemented that includes a controller 104A and a system drive 106 with a plurality of storage disk drives 108. The controller is coupled via a host bus 103 to a server 102 A. The controller 104 includes a logic unit (LUN) 109 which receives and outputs data to the server 104A and allows the controller to map from the LUN to the system drive 106. The LUN 109 includes a physical interface 110 and a SCSI LUN Number 111. The controller 104A is coupled to the system drive 106 through one or more buses 105. The buses 105 directly connect through a variety of means know in the art to one or more disk drives 108 of the system drive 106.

Figure 3:
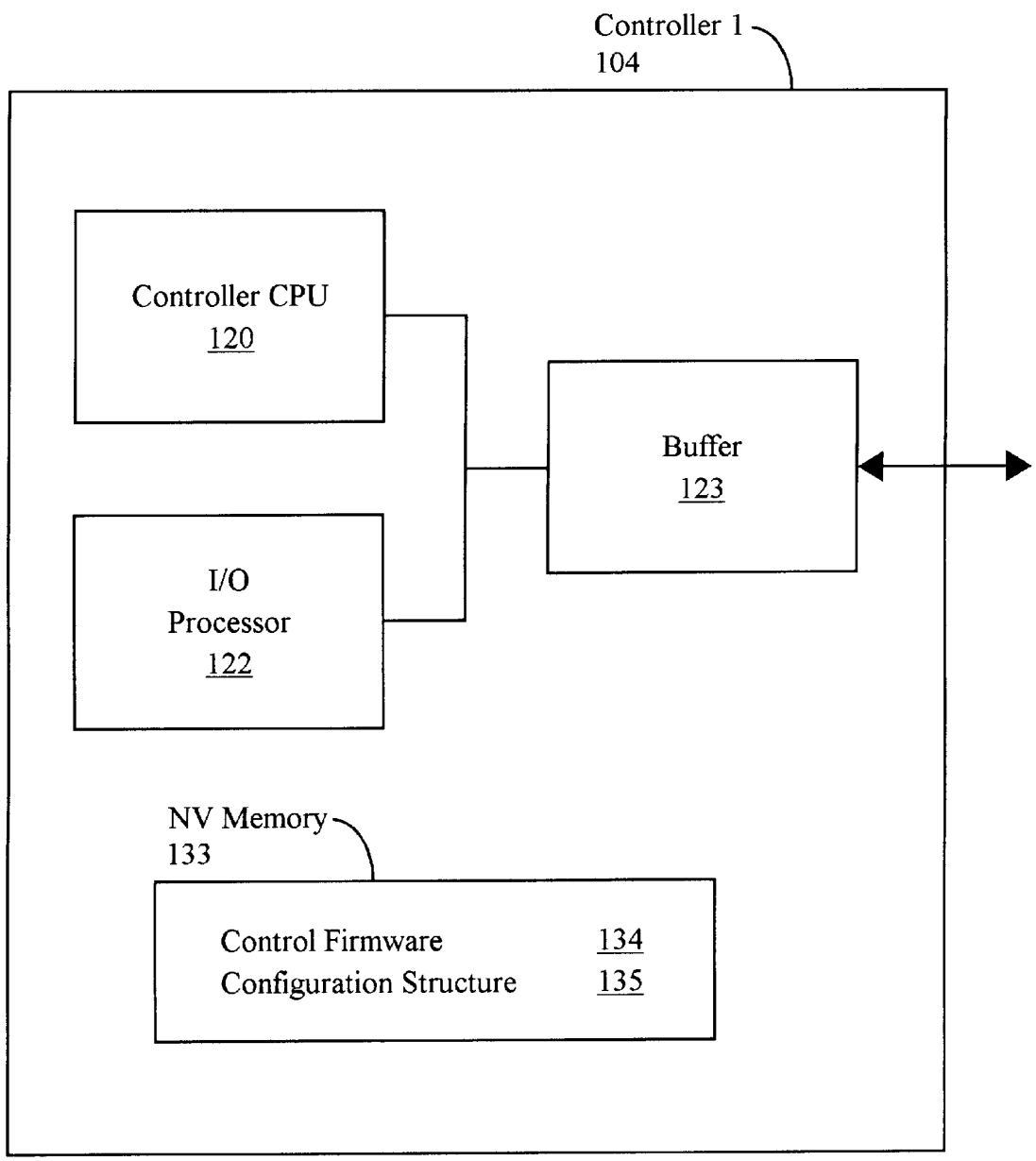
FIG. 3 is a block diagram of a controller with a buffer and NV memory that provides control for the snapshot backup.

FIG. 3 shows a block diagram of the controller 104. The controller 104 includes a CPU 120, an I/O processor 122, a buffer 123 and control firmware 134. The buffer 123 is used to store information during a snapshot backup. The non-volatile memory or NV memory 133 includes commands used to control the snapshot backup.

FIG. 4 shows a block diagram of the NV memory 133 that includes the firmware 134 and a configuration structure 135. Included within the firmware are stored commands 142 including: snapshot initiate direct command 144, snapshot terminate direct command 145, start long operation command 146, and get long operation status command 147. Command error condition 144A is associated with the initiate snapshot 144 command and error condition 145A is associated with terminate snapshot 145 command. The error conditions 144A, 145A are reported to the controller during the snapshot backup. Return data 146A is also sent to the controller during the start long operation 146, and return data 147A is sent to controller during the get long operation status 147. The configuration structure 135 is also included within the NV memory 133. The configuration structure can be configured as a RAID field 148 which can be defined as a log system drive or LOG 149.

Referring to FIG. 2, the basic storage unit that snapshot backup deals with is the system drive 106. A system drive 106 can consist of any number of physical disk drives 108, or can be composed of portions of physical disk drives. These physical storage units are organized into the system drive through various RAID levels, and can be any size. Operations of the components are well know in the art apart from any additional changes introduced by the present invention.

Figure 5:
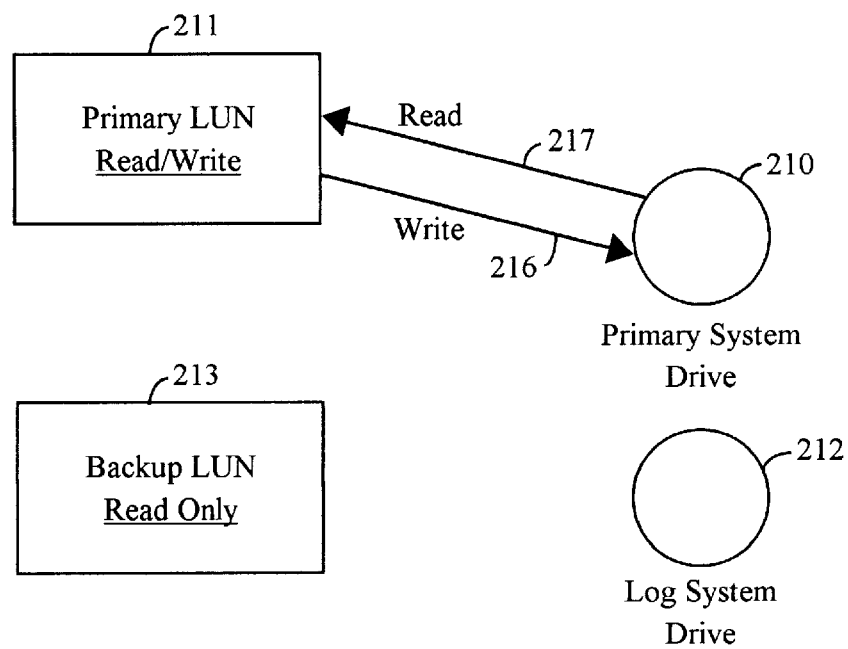
FIG. 5 is a block diagram of a system drive of a host system that provides for normal read and write operations.
Figure 6:
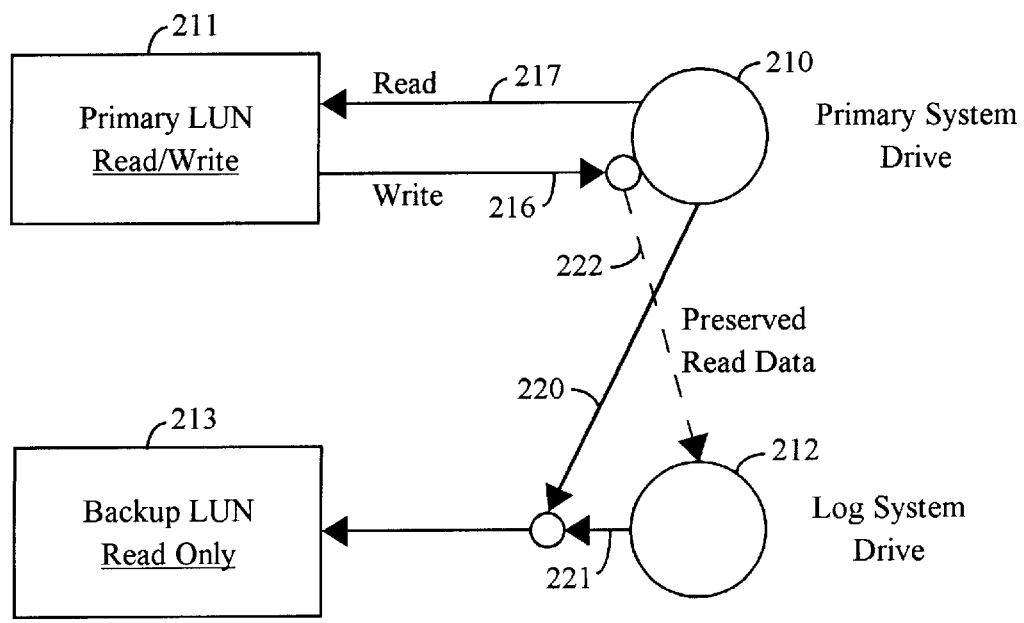
FIG. 6 is a block diagram of a system drive during a snapshot backup procedure including read access from the backup LUN.
Figure 8:
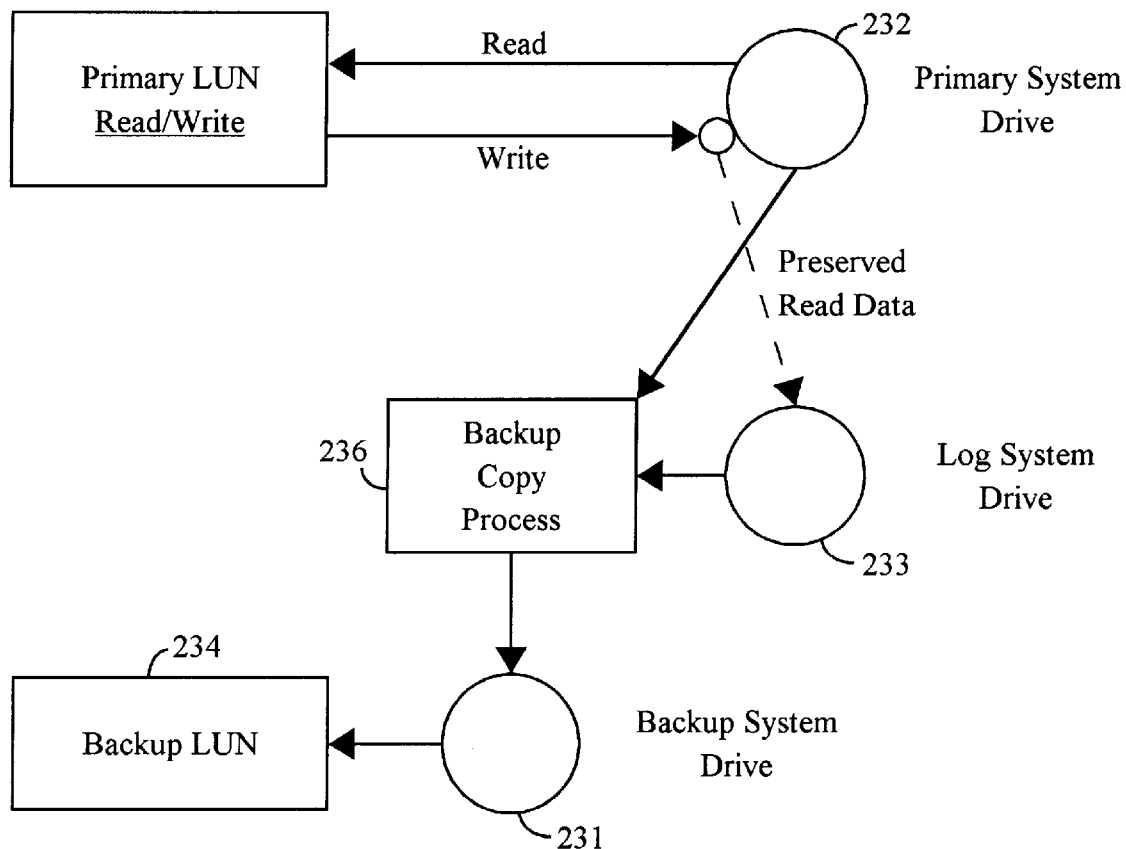
FIG. 8 is a block diagram of a system drive during a snapshot backup procedure including a backup system drive.

There can be any number of system drives 106 in an array system, and these can be mapped to the world outside the array through LUNs 211, 213 as shown in FIGS. 5, 6 and 8. A LUN includes:

A physical interface 110, shown in FIG. 2. This may be a SCSI port, as in the case of a DAC960SX configuration, or it may consists of a Fibre channel port in the DAC960SF. These controllers have two host ports, and each port may take on any SCSI or Fibre target address. An attribute of the port is the port number, either zero or one.

A logical interface 111, shown in FIG. 2. The host interface also defines a LUN 109 number that allows data paths through the same physical interface. This is the SCSI LUN number 111.

For the purposes of this description, the Array system will be simplex, or a single controller system. The dual-active system is an extension of the simplex case, and will be discussed later in this document.

Note that the concept of a SCSI LUN is expanded in this context to include both the port number and the SCSI LUN number. A system drive can have a one to many mapping, where a system drive can be accessed through more than one LUN. LUNs can connect to exactly one system drive.

The snapshot backup process includes two system drives as shown in FIGS. 5 and 6:

The Primary System Drive 210. This is the primary storage area where data is written 216 and read 217 for normal operation of the system. The primary system drive 210 can be any size, and can be any RAID level. The primary system drive 210 is accessed through one or more primary LUNs 211.

A Log System Drive 212. This log system drive 212 can be any size or RAID level, although it is usually smaller than primary system drive 210. The log system drive 212 is accessed through one or more backup LUNs 213.

Taken together, drives 210 and 212 form a backup pair. Backup pairs are not necessarily static. Log system drive 212 can be shared among the other primary system drives (not shown) in the system, if one snapshot backup process is allowed to be active at any time.

In normal operation, shown in FIG. 5, read 217 and write 216 requests are issued to the primary system drive 210. During a write request 216, the log system drive 212 remains idle and the backup LUN 213 is not active. The backup LUN 213 responds with a SCSI check condition, drive not ready, because the system in not actively performing a snapshot backup.

In backup operation, shown in FIG. 6, the backup LUN 213 is now available, accepts only read operations, and can access data from both primary system drive 210 and log system drive 212. In response to a read request 217 on backup LUN 213, the controller (not shown) first checks to see if the data to fulfill the request is available on log system drive 212. If so, the information is read 221 from log system drive 212 and returned to the requester (not shown). If not, the data is read 220 from primary system drive 210 and returned to the requestor. Any write operations to backup LUN 213 are rejected.

In backup operation, read requests 217 from primary LUN 211 are serviced solely from primary system drive 210. Write requests 216 are also serviced by primary system drive 210, but the data that is about to be overwritten is read and buffered, as buffered data 221. This allows the old data, necessary for the snapshot backup, to be preserved and written to log system drive 212 for storage. If this is the first write 216 to the sector (not shown) in primary system drive 210 after the snapshot was initiated, the buffered data 221 is written to log system drive 212. Otherwise, buffered data 221 is discarded.

The additional search and write operations have a small performance impact on primary system drive 210, since they can be scheduled after write request 216 to primary system drive 210 has completed. Note that buffered data 221 is already available in RAID 5 systems (not shown) where a read-modify-write operation can be scheduled for any write operation.

Since the log system drive 212 has a finite capacity, it eventually fills with write data. This can include a method for starting and ending the backup operation. In addition, a consistent file system backup can include the host system to flush any data from the system's internal cache (not shown). Consequently, some host intervention is needed to flush the host's buffers (not shown) and initiate the snapshot backup process. Likewise, the host system needs to inform the controller when to terminate the snapshot backup process.

The size and RAID level of the log system drive 212 depend on the write/read ratio of the application and the size of the primary system drive 210. Since the log system drive 212 is simply a system drive, it can be reconfigured any time the backup process is not active to either increase or decrease in size or RAID level. The configuration of the log system drive 212 can be easily tuned for the particular application.

In the event that log system drive 212 becomes full, read 217 and write 216 requests to primary LUN 211 continues normally. The backup LUN 213 first responds with a vendor unique error code, specifying log system drive 212 has overflowed. Backup LUN 213 then goes into a drive not ready state until the next snapshot backup is initiated.

As a result of this method, the performance of the system in servicing write 216 and read 217 requests through primary LUN 211 is unaffected. The performance of backup LUN 213 is lower than read requests 217 through primary LUN 211 to do the lookup operation required for each read 221. The magnitude of this degradation depends on the lookup method used, and on the availability of system resources.

Figure 7:
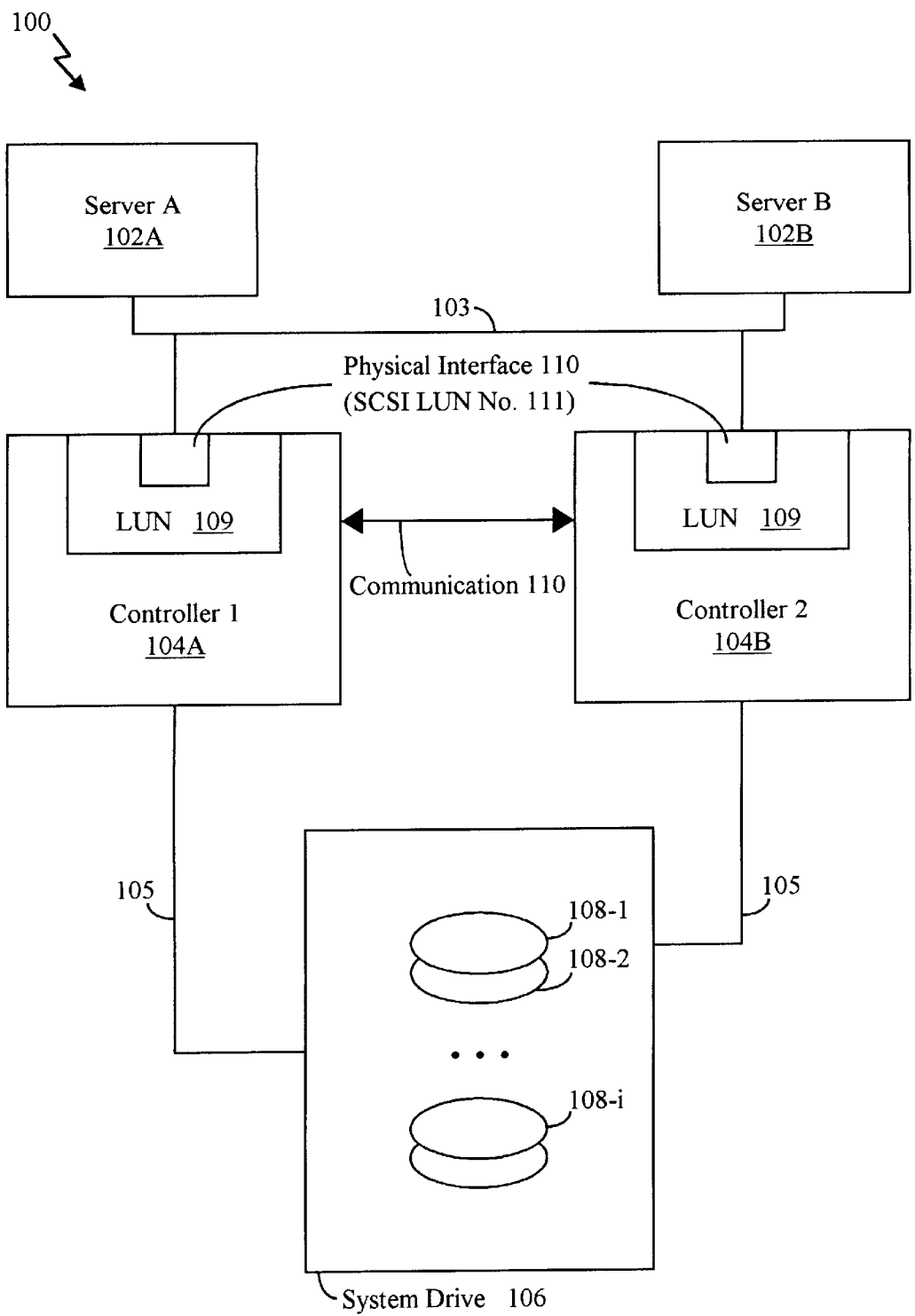
FIG. 7 is a block diagram of a dual active controller system that controls the snapshot backup of the drive system.

In a duplex controller configuration (dual active controllers), as shown in FIG. 7, information about the status of a snapshot backup and the current state of log system drive 212 requires communication between the two controllers (not shown). This is routinely handled by the cache mirroring techniques that use the SCSI back-end channels (not shown); snapshot backup uses these mechanisms.

Information about the state of log system drive 212 is communicated between controllers to accommodate two operations:

1. Accessing the backup LUN 213 from more than one controller or accessing backup LUN 213 from a different controller than the primary LUN 211. Since the backup LUN 213 is read only, there is no requirement for write locking parity stripes on the disks, and several initiators can easily access the same snapshot backup. By allowing the backup LUN 213 to reside on a different controller than the primary LUN 211, performance loss is also minimized.

2. In the event a failure occurs, the surviving controller can preserve the snapshot backup operations. Any hash tables or search trees (not shown) used for the log system drive 212 can be synchronized across controllers.

When a snapshot backup is initiated, the second controller is notified that the process has started through the back-end SCSI channels (not shown). This allows the second controller to initialize any information regarding log system drive 212. Ongoing changes to log system drive 212 are maintained by monitoring the normal write cache mirroring employed in dual active controller configurations.

Referring to FIG. 8, an alternate method of accessing the snapshot backup can be implemented by initiating the snapshot and copying the read-only data to a second system drive. This backup system drive 231 becomes a duplicate of primary system drive 232 at the time the snapshot was initiated, as shown in FIG. 8. This feature allows the array controller (not shown) to actually perform the backup, with little intervention from the host system (not shown), and no loss in any of the data transfer channels to the host computer system(s).

Backup system drive 231 should be of at least the same size (same number of logical blocks) as primary system drive 232. Backup system drive 231 can be larger, and it can be any RAID level or number of drives. Finally, backup system drive 231 can be mapped into LUNs in the same way as any system drive, although the drive does not become available until the snapshot copy has completed.

The process for initiating a snapshot backup to a backup system drive 231 is:

1. A log system drive 233 and a backup system drive 231 can be configured on the controller (not shown). The log system drive 233 can be any size or RAID level, but should be defined as a log system drive 233. Backup system drive 231 is simply a system drive with size equal to or larger than primary system drive 232.

2. An Initiate Snapshot command is issued to start the snapshot backup process.

3. A System Drive Copy command is issued to the controller, with the source drive set to be in log system drive 233, and the destination drive set to backup system drive 231.

4. The copy process 236 can be monitored by a System Drive Copy Status command. While the copy is being performed, the backup LUNs 234 associated with backup system drive 231 responds with busy status. Any LUNs (not shown) associated with log system drive 233 operates as a normal snapshot backup LUN, with read-only capability.

5. When the copy is complete, backup system drive 231 responds normally to all read and write commands, and the snapshot backup process terminates.

This process allows a snapshot to be copied to a new system drive that can be accessed separately from primary system drive 232. Backup system drive 231 can consist of disks or removable media devices (not shown) that can be removed from the controller and set aside, or placed into another array.

The time to copy the primary system drive snapshot to backup system drive 231 can be significantly reduced by allowing incremental updates of backup drive 231. Once backup system drive 231 is established, any changes to primary system drive 232 can be tracked. These can then be migrated into backup system drive 231 copying only those sectors (not shown) that have changed. This process significantly reduces backup time at the cost of some additional system memory.

There are two parts to the snapshot backup interface: the configuration structures 135, where information about backup pairs is stored, and the direct SCSI commands that initiate 144 and terminate 145 the snapshot backup process. Preferred embodiments of these two parts for the DAC960SX and DAC960SF controllers are now described.

The single change to the conventional configuration structure identifies the system drive as a log system drive. AU of the remaining attributes for a system drive apply to a log system drive. This includes LUN affinty, so that it may be possible to access a snapshot backup through more than one LUN. One system drive can be set to a log system drive.

The existing configuration structure 135 for a system drive is:

The raid field 148 can take on the following values:

```
/* defines for S_D_E->raid */
#define NORAID       7       /* JBOD, Single virtual drive        */
#define RAID0        0       /* Striping, No of vdrives >=2.      */
                             /* Does not include single drive case */
#define RAID1        1       /* Mirrored drives, no of vdrives = 2 */
#define RAID3        3       /* RAID-3                            */
#define RAID5        5       /* Raid-5, no or vdrives >=3         */
#define RAID6        6       /* RAID 0+1, mirror striped          */
#define WB_MSK       0x80    /* configured Write Policy           */
                             /* set for write-back caching        */
#define RAID_MASK    0x0F    /* low nibble is RAID level          */
```

A system drive is defined to be a log system drive by adding in the LOG define. The new values for the raid field 148 are:

```
/* defines for S_D_E->raid */
#define NORAID       7       /* JBOD, Single virtual drive        */
#define RAID0        0       /* Striping, No of vdrives >=2.      */
                             /* Does not include single drive case */
#define RAID1        1       /* Mirrored drives, no of vdrives = 2 */
#define RAID3        3       /* RAID-3                            */
#define RAID5        5       /* Raid-5, no or vdrives >=3         */
#define RAID6        6       /* RAID 0+1, mirror striped          */
#define WB_MSK       0x80    /* configured Write Policy           */
                             /* set for write-back caching        */
#define LOG          0x40    /* Set for log system drive          */
#define RAID_MASK    0x0F    /* low nibble is RAID level          */
```

There are two direct commands that implement the snapshot backup. One command 144 to start the snapshot, and another 145 to terminate the snapshot.

The initiate Snapshot command 144, depicted in FIG. 4, can be issued to the LUN that is being backed up (the primary LUN). This allows the host system to flush any cache buffers and initiate the snapshot area. The Command description Block (CDB) of this command is shown in Table 1. (Note: the CDB is part of the SCSI protocol.)

TABLE 1

Initiate Snapshot Direct Command CDB (144)

| Bit/Byte | 7 | 6 | 5 | 4 | 3 | 2 | 1 | 0 |
|---|---|---|---|---|---|---|---|---|
| 0 | Operation Code (20h) | | | | | | | |
| 1 | LUN | | | Reserved | | | | |
| 2 | DCMD OP CODE - SNAPSHOT INITIATE (0xXX) | | | | | | | |
| 3 | Reserved | | | | | | | |
| 4 | Reserved | | | | | | | |
| 5 | Reserved | | | | | | | |
| 6 | Reserved | | | | | | | |

```
typedef struct _S_D_E
{
    u_char status;              /* system drive status              */
                                /* ONLINE, OFFLINE, CRITICAL        */
    u_char raid;                /* RAID Level                       */
    u_char n_drvs;              /* Used only for RAID 0,5,6         */
    u_char affinity;            /* Target ID owns this LUN          */
    VDRIVE vdrive[MAX_VDRIVES]; /* Virtual Drive Definition         */
} S_D_E;
```

TABLE 1-continued

Initiate Snapshot Direct Command CDB (144)

| Bit/Byte | 7 | 6 | 5 | 4 | 3 | 2 | 1 | 0 |
|---|---|---|---|---|---|---|---|---|
| 7 | | | | Reserved | | | | |
| 8 | | | | Reserved | | | | |
| 9 | | | | Control Byte | | | | |

The possible error conditions (Table 2) are returned by a check condition status, and the following sense data:

TABLE 2

Initiate Snapshot Direct Command Error Conditions (144A)

| Status | SK | ASC | ASCQ | Description |
|---|---|---|---|---|
| 0x00 | 0x00 | 0x00 | 0x00 | Good Completion, snapshot ready. |
| 0x02 | 0x05 | 0x24 | 0x00 | Illegal CDB |
| 0x02 | 0x09 | 0x81 | 0x06 | A rebuild operation is in progress |
| 0x02 | 0x09 | 0x81 | 0x0C | An initialization operation is in progress |
| 0x02 | 0x09 | 0x81 | 0x0D | A check consistency operation is in progress |
| 0x02 | 0x09 | 0x81 | 0x10 | A snapshot backup is already in progress |
| 0x02 | 0x09 | 0x81 | 0x19 | A log LUN has not been defined. |
| 0x02 | 0x09 | 0x81 | 0x20 | Command issued to a backup LUN. |

SK = Sense Key
ASC = Additional Sense Code
ASCQ = Additional Sense Code Qualifier The terminate Snapshot command, 145, depicted in FIG. 4, and the CBD shown in Table 3, can be issued either to the LUN that was being backed up (the primary LUN), or to the backup LUN. This allows the backup process to terminate the snapshot as soon as it has completed. No notification is made to the primary LUN when the snapshot is terminated through the backup LUN.

TABLE 3

Terminate Snapshot Direct Command CDB (145)

| Bit/Byte | 7 | 6 | 5 | 4 | 3 | 2 | 1 | 0 |
|---|---|---|---|---|---|---|---|---|
| 0 | | | | Operation Code (20h) | | | | |
| 1 | | LUN | | | Reserved | | | |
| 2 | | | DCMD OP CODE - SNAPSHOT TERMINATE (0xXX) | | | | | |
| 3 | | | | Reserved | | | | |
| 4 | | | | Reserved | | | | |
| 5 | | | | Reserved | | | | |
| 6 | | | | Reserved | | | | |
| 7 | | | | Reserved | | | | |
| 8 | | | | Reserved | | | | |
| 9 | | | | Control Byte | | | | |

The possible error conditions (Table 4) are returned by a check condition status, and the following sense data:

TABLE 4

Terminate Snapshot Direct Command Error Conditions (145A)

| Status | SK | ASC | ASCQ | Description |
|---|---|---|---|---|
| 0x00 | 0x00 | 0x00 | 0x00 | Good Completion, snapshot terminated. |
| 0x02 | 0x05 | 0x24 | 0x00 | Illegal CDB |

TABLE 4-continued

Terminate Snapshot Direct Command Error Conditions (145A)

| Status | SK | ASC | ASCQ | Description |
|---|---|---|---|---|
| 0x02 | 0x09 | 0x81 | 0x0C | A snapshot backup was not in progress |

SK = Sense Key
ASC = Additional Sense Code
ASCQ = Additional Sense Code Qualifier The Start Long Operation 146, as depicted in FIG. 4, and the CBD shown in Table 5, starts the system drive copy. The operation can be performed as an asynchronous (background) operation. The status of the operation is returned during the data in phase, which is 2 bytes long.

Note that the addressed logical unit is passed as a field in the command descriptor block. The values in the identify message or in byte 1 of the command descriptor block are ignored. Descriptions of the Start Long Operation CDB Fields are provided in Table 6.

TABLE 5

Start Long Operation CDB (146)

| Bit/Byte | 7 | 6 | 5 | 4 | 3 | 2 | 1 | 0 |
|---|---|---|---|---|---|---|---|---|
| 0 | | | | Operation Code (20h) | | | | |
| 1 | | LUN | | | Reserved | | | |
| 2 | | | DCMD OP CODE - LOP Start (0x44) | | | | | |
| 3 | | | | Opcode | | | | |
| 4 | | | | Source Device Address | | | | |
| 5 | | | | Destination Drive Address | | | | |
| 6 | | | | Reserved | | | | |
| 7 | | | | Allocation Length (MSB) | | | | |
| 8 | | | | Allocation Length (LSB) | | | | |
| 9 | | | | Control Byte | | | | |

TABLE 6

Start Long Operation Field Descriptions

| Field | Description |
|---|---|
| LUN | Logical Unit Number. This field is ignored and should be set to zero. |
| Opcode | The operation to be executed; 0xXX copy system drive Note that other opcodes can be used with this operation. Refer to the SCSI Command Reference Manual for full details. |
| Source Device Address | The system drive to be copied, from 0x00 to 0x07. |
| Destination Device Address | The destination system drive of the copy, from 0x00 to 0x07. |
| Allocation Length | Specifies the number of bytes the initiator has allocated for the returned data. A value of zero if not considered an error and the command completes successfully with no data returned to the initiator. The controller terminates the data transfer when the requested number of bytes has been transferred or when all available data has been transferred, whichever is less. The maximum data transferred is 2 bytes. |
| Control Byte | Must be set to zero. |
| Reserved | Must be set to zero. |

This command returns good status.

This command returns the following data (Table 7). Note that the LOP Start command supports other operations, and these operations may return data that is different from that described in this document. Please refer to the SCSI Command Reference Manual for full details.

TABLE 7

Start Long Operation Return Data (146A)

| Data | Description |
| --- | --- |
| 0x0000 | Copy Started Successfully. |
| 0x0002 | One of the system drives is not ready. |
| 0x0105 | An invalid system drive was specified. |
| 0x0106 | A copy is already in progress. |

Get Long Operation Status command 147, as shown in FIG. 4, (Table 8) returns information on the status of a long operation, in this case, the system drive copy. The status of the operation is returned during the data in phase.

Note that the addressed logical unit is passed as a field in the command descriptor block. The values in the identify message or in byte 1 of the command descriptor block are ignored. Descriptions of the Get Long Operation Status CDB fields are provided in Table 9.

TABLE 8

Get Long Operation Status CDB (147)

| Bit/Byte | 7 | 6 | 5 | 4 | 3 | 2 | 1 | 0 |
| --- | --- | --- | --- | --- | --- | --- | --- | --- |
| 0 | Operation Code (0x20) | | | | | | | |
| 1 | LUN | | | Reserved | | | | |
| 2 | DCMD OP CODE - LOP Status (0x43) | | | | | | | |
| 3 | Opcode | | | | | | | |
| 4 | Reserved | | | | | | | |
| 5 | Reserved | | | | | | | |
| 6 | Reserved | | | | | | | |
| 7 | Allocation Length (MSB) | | | | | | | |
| 8 | Allocation Length (LSB) | | | | | | | |
| 9 | Control Byte | | | | | | | |

TABLE 9

Get Long Operation Status Field Descriptions

| Field | Description |
| --- | --- |
| LUN | Logical Unit Number. This field is ignored and should be set to zero. |
| Opcode | The operation to be executed:<br>0xXX copy system drive<br>Note that other opcodes can be used with this operation. Refer to the SCSI CommandReference Manual for full details. |
| Allocation Length | Specifies the number of bytes the initiator has allocated for the returned data. A value of zero if not considered an error and the command completes successfully with no data returned to the initiator. The controller terminates the data transfer when the requested number of bytes has been transferred or when all available data has been transferred, whichever is less. The maximum data transferred is 2 bytes. |
| Control Byte | Must be set to zero. |
| Reserved | Must be set to zero. |

This command returns good status.

This command returns the following data (Table 10). Note that the LOP Status command supports other operations, and these operations may return data that is different from that described in this document. Please refer to the SCSI Command Reference Manual for full details.

TABLE 10

Get Long Operation Status Return Data (147A)

| Data | Description |
| --- | --- |
| 0x0000 | Copy is in progress. |
| 0x0100 | Copy completed successfully. |
| 0x0002 | One of the system drives is not ready. |
| 0x0105 | No copy in progress. |
| 0x0001 | Irrecoverable data errors. |
| 0x0107 | Copy terminated by command. |

Along with the direct SCSI commands, the front panel/LCD display and the VT-100 interface supports manual operation of snapshot backup. The LUN can be set to LOG as a part of the LUN configuration utilities, and the snapshot can be started/ended through the administration menu.

Error conditions can arise in normal operation of the snapshot backup. These are associated with the backup LUN, since the primary LUN appears "normal" to the host system, and any errors are reported only through the backup LUN.

In the event that I/O is attempted to a backup LUN without an active snapshot (an initiate snapshot command has not been issued), the LUN returns with a check condition status, and sense key of 0x02, not ready.

In the event that the LOG system drive overflows, the backup LUN returns a check condition status, and sense key of 0x09; vendor unique, and an additional sense code of 0xXX, Log Overflow. Subsequent accesses return a check condition status, and sense key of 0x02, not ready. Once a backup LUN overflows, the snapshot is terminated in the same way as issuing a terminate snapshot direct command.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

What is claimed is:

1. A method of performing a snapshot backup of a storage unit of a host system including at least one primary system drive, at least one log system drive and at least one backup logic unit while allowing normal read operations and write operations to occur, comprising:

a) processing a write operation of new data submitted to a primary logic unit to be written to at least one sector of the primary system drive during the snapshot backup including:

i) reading old data on the primary system drive that is to be overwritten by the new data in response to the write operation;

ii) buffering the old data;

iii) overwriting the old data with the new data; and iv) writing the old data to the log system drive if the write operation is a first write operation to the sector in the primary system drive for the snapshot backup:

(b) processing a read operation submitted to the backup logic unit during the snapshot backup including:

i) accessing requested data of the read operation from the log system drive if the requested data is available from the log system drive and returning the requested data:

ii) accessing the requested data from the primary system drive if the requested data is not available from the log system drive and returning the requested data.

2. The method of performing a snapshot backup of claim 1, further comprising the step of:
    flushing any data from an internal cache of the host system.

3. The method of performing a snapshot backup of claim 1, further comprising the step of:
    writing the old data to the log system drive after the overwriting of the old data with the new data has completed.

4. The method of performing a snapshot backup of claim 1 wherein:
    responding with an error code from the backup logic unit when the log drive becomes full and entering the backup logic unit into a drive not ready state.

5. The method of performing a snapshot backup of claim 1 wherein:
    accessing the backup logic unit from at least two controllers.

6. The method of performing a snapshot backup of claim 5 wherein:
    at least one of the two controllers is a RAID controller.

7. The method of performing a snapshot backup of claim 1 further comprising:
    preserving the snapshot backup through a second controller in the event a failure of a first controller occurs.

8. The method of performing a snapshot backup of claim 1 wherein:
    notifying a second controller through back-end SCSI channels when a first controller initiates a snapshot backup;
    initializing information regarding the log system drive by the second controller; and
    monitoring a normal write cache mirroring to maintain ongoing changes to the log system drive during the snapshot backup.

9. The method of performing a snapshot backup of claim 1 wherein:
    accessing the backup logic unit from at least one controller that is different than a controller accessing the primary logic unit.

10. The method of performing a snapshot backup of claim 1 wherein:
    structuring the primary system drive utilizing a RAID strategy.

11. The method of performing a snapshot backup of claim 1 wherein:
    utilizing the log system drive with more than one primary system drive and limiting the snapshot backup to a single primary system drive at any given time.

12. The method of performing a snapshot backup of claim 1 wherein:
    directing No an initializing of the snapshot backup to the primary logic unit coupled to the primary system drive.

13. The method of performing a snapshot backup of claim 1 wherein:
    directing a terminating of the snapshot backup to one of the primary logic unit coupled to the primary system drive and the backup logic unit.

14. A method of performing a snapshot backup of a storage unit of a host system including at least one controller, at least one primary system drive, a log system drive, at least one logic unit and a buffer while allowing normal read operations and write operations to occur comprising:
    a) initializing the snapshot backup;
    b) issuing a system drive copy command to the controller and copying the log system drive to at least one backup system drive;
    c) processing a read operation submitted to the logic unit coupled to the log system drive during the snapshot backup including:
        i) accessing requested data of the read operation from the log system drive if the requested data is available from the log system drive and returning the requested data to a requester;
        ii) accessing the requested data from the primary system drive if the requested data is not available from the log system drive and returning the requested data to the requester;
    d) processing a write operation of new data submitted to a primary logic unit to be written to a sector of the primary system drive during the snapshot backup including:
        i) reading old data on the primary system drive that is to be overwritten by the new data in response to the write operation;
        ii) buffering the old data in the buffer;
        iii) overwriting the old data with the new data;
        iv) writing the old data from the buffer to the log system drive if the write operation is a first write operation to the sector in the primary system drive for the snapshot backup; and
    e) terminating the snapshot backup.

15. The method of performing a snapshot backup of claim 14 wherein:
    designating the logic unit coupled to the backup drive system as a backup logic unit and responding with a busy status to the read operation or the write operation issued to the backup logic unit while the copying of the log system drive to the backup system drive is in progress.

16. The method of performing a snapshot backup of claim 14 wherein:
    the backup system drive is at least equal in size to the primary system drive.

17. The method of performing a snapshot backup of claim 14 wherein:
    configuring the log system drive and the backup system drive onto the same controller.

18. The method of performing a snapshot backup of claim 17 further comprising:
    monitoring the copying of the log system drive to the backup system drive through a system drive copy status command.

19. The method of performing a snapshot backup of claim 14 further comprising:
    monitoring changes to the sectors of the primary system drive following the termination of the snapshot backup and copying only those sectors that have changed since the termination of the snapshot into the backup system drive.

20. A storage unit of a host system including at least one primary system drive, at least one log system drive and at least one backup logical unit adapted to create a snapshot backup comprising:
    a) means for initializing a snapshot backup coupled with a means for processing a read operation, and further coupled with a means for processing a write operation;
    b) the means for processing the read operation submitted to a backup logic unit during the snapshot backup including:

i) means for accessing requested data of the read operation from the log system drive if the requested data is available from the log system drive and returning the requested data;

ii) means for accessing the requested data from the primary system drive if the requested data is not available from the log system drive and returning the requested data; and c) the means for processing a write operation of new data submitted to a primary logic unit to be written to at least one sector of the primary system drive during the snapshot backup including:

i) means for reading old data on the primary system drive that is to be overwritten by the new data in response to the write operation;

ii) means for buffering the old data;

iii) means for overwriting the old data with the new data; and iv) means for writing the old data to the log system drive if the write operation is a first write operation to the sector in the primary system drive for the snapshot backup.

21. The storage unit of a host system adapted to create a snapshot backup as claimed in claim 20, wherein:

the means for processing the read operation comprising at least a controller; and the means for processing the write operation comprising at least the controller.

22. A storage unit of a host system adapted to create a snapshot backup, comprising:

a) at least one controller which initializes and terminates the snapshot backup;

b) at least one backup logic unit electronically coupled to a log system drive such that requested data is accessed from the log system drive if the requested data is available from the log system drive during a read operation and returned to a requester;

c) the backup logic unit electronically coupled to at least one primary system drive such that the requested data is accessed from the primary system drive if the requested data is not available from the log system drive during the read operation and returned to the requester;

d) at least one primary logic unit electronically coupled to the primary system drive such that new data submitted to the primary logic unit is written to a sector of the primary system drive;

e) a buffer electronically coupled to the primary system drive such that old data that is to be overwritten by the new data submitted to the primary logic unit is buffered prior to being overwritten;

f) the buffer further electronically coupled to the log system drive such that the old data is written to the log system drive if the new data written to the primary system drive is the first data to be written to the sector during the snapshot backup; and g) a backup system drive electronically coupled with the log system drive, and configured to store a copy of at least a portion of data stored within the log system drive.

23. A computer program product for performing a snapshot backup of a storage unit of a host system including at least one primary system drive, at least one log system drive and at least one backup logic unit while allowing normal read operations and write operations to occur, the computer program product including a computer readable medium and a computer program mechanism stored thereon, the computer program mechanism comprising:

a snapshot backup procedure configured to:

process a read operation submitted to the backup logic unit during the snapshot backup, including:

accessing requested data of the read operation from the log system drive if the requested data is available from the log system drive and returning the requested data;

accessing the requested data from the primary system drive if the requested data is not available from the log system drive and returning the requested data;

process a write operation of new data submitted to a primary logic unit to be written to the primary system drive during the snapshot backup including:

reading old data on the primary system drive that is to be overwritten by the new data in response to the write operation;

buffering the old data;

overwriting the old data with the new data; and writing the old data to the log system drive if the write operation is a first write operation to a sector in the primary system drive for the snapshot backup.

24. A computer program product for performing a snapshot backup of a storage unit of a host system including at least one controller, at least one primary system drive, a log system drive, at least one logic unit and a buffer while allowing normal read operations and write operations to occur, the computer program product including a computer readable medium and a computer program mechanism stored thereon, the computer program mechanism comprising:

a snapshot backup process configured to:

copy the log system drive to at least one backup system drive;

process a read operation submitted to the logic unit coupled to the log system drive during the snapshot backup including:

accessing requested data of the read operation from the log system drive if the requested data is available from the log system drive and returning the requested data;

accessing the requested data from the primary system drive if the requested data is not available from the log system drive and returning the requested data;

process a write operation of new data submitted to a primary logic unit to be written to at least one sector of the primary system drive during the snapshot backup including:

reading old data on the primary system drive that is to be overwritten by the new data in response to the write operation;

buffering the old data in the buffer;

overwriting the old data with the new data; and writing the old data from the buffer to the log system drive if the write operation is a first write operation to the sector in the primary system drive for the snapshot backup.

25. A snapshot backup system for use by a host computer, comprising:

least one primary system drive where data is written and read during normal operation of the backup system;

one or more primary logical units through which the primary system drive is accessed by the host, each of the primary logical units including a physical interface and a logical interface;

at least one log system drive where data is written for backup purposes during backup operation of the backup system;

one or more backup logical units through which the log system drive is accessed by the host, each of the backup logical units including a physical interface and a logical interface;

wherein, during the backup operation:

the snapshot backup system is configured to respond to write requests targeting the primary system drive by:

reading and buffering the data in at least one sector of the primary system drive that is to be overwritten by a write request;

when the write request is the first request to write to the sector, writing the data to the log system drive; and completing the write request to the primary system drive; and the snapshot backup system is configured to respond to read requests targeting the log system drive by:

returning the data fulfilling a read request from the log system drive when possible; and otherwise returning the data to fulfill the read request from the primary system drive.

26. A method of performing a snapshot backup of a storage unit of a host system including at least one primary system drive, at least one log system drive, at least one backup system drive, and at least one logic unit while allowing normal read operations and write operations to occur comprising:

a) copying the log system drive to the backup system drive;

b) processing a read operation submitted to the logic unit during the snapshot backup including:

i) accessing requested data of the read operation from the log system drive if the requested data is available from the log system drive and returning the requested data;

ii) accessing the requested data from the primary system drive if the requested data is not available from the log system drive and returning the requested data; and c) processing a write operation of new data submitted to a primary logic unit to be written to at least one sector of the primary system drive during the snapshot backup including:

i) reading old data on the primary system drive that is to be overwritten by the new data in response to the write operation;

ii) buffering the old data;

iii) overwriting the old data with the new data; and iv) writing the old data to the log system drive if the write operation is a first write operation to the sector in the primary system drive for the snapshot backup.

27. The method of performing a snapshot backup as claimed in claim 26, wherein:

preserving the snapshot backup through a second controller in the event a failure of a first controller occurs.

* * * * *